(12) United States Patent
Wolff

(10) Patent No.: US 7,904,502 B2
(45) Date of Patent: *Mar. 8, 2011

(54) METHOD AND APPARATUS FOR PROCESSING DOCUMENT REQUESTS AT A SERVER

(75) Inventor: Gregory J. Wolff, Mountain View, CA (US)

(73) Assignee: Ricoh Co., Ltd., Tokyo (JP)

( * ) Notice: Subject to any disclaimer, the term of this patent is extended or adjusted under 35 U.S.C. 154(b) by 1224 days.

This patent is subject to a terminal disclaimer.

(21) Appl. No.: 10/845,707

(22) Filed: May 14, 2004

(65) Prior Publication Data

US 2005/0021608 A1    Jan. 27, 2005

Related U.S. Application Data

(63) Continuation of application No. 09/383,066, filed on Aug. 25, 1999, now Pat. No. 6,738,841, which is a continuation-in-part of application No. 08/599,373, filed on Feb. 9, 1996, now Pat. No. 6,209,048.

(51) Int. Cl.
*G06F 15/16* (2006.01)
(52) U.S. Cl. ......................................... 709/202; 709/219
(58) Field of Classification Search ................... 709/203, 709/219, 217, 202
See application file for complete search history.

(56) References Cited

U.S. PATENT DOCUMENTS

| | | | |
|---|---|---|---|
| 5,793,964 A | | 8/1998 | Rogers et al. |
| 6,012,083 A | * | 1/2000 | Savitzky et al. ............... 709/202 |
| 6,020,973 A | | 2/2000 | Levine et al. |
| 6,023,722 A | | 2/2000 | Colyer |
| 6,029,245 A | | 2/2000 | Scanlan |
| 6,119,137 A | | 9/2000 | Smith et al. |
| 6,125,372 A | | 9/2000 | White |
| 6,163,778 A | * | 12/2000 | Fogg et al. ....................... 707/10 |
| 6,184,996 B1 | | 2/2001 | Gase |
| 6,233,618 B1 | * | 5/2001 | Shannon ........................ 709/229 |
| 6,247,011 B1 | | 6/2001 | Jecha et al. |

(Continued)

FOREIGN PATENT DOCUMENTS

JP           09-026970           1/1997

(Continued)

OTHER PUBLICATIONS

Bradley, S.W., et al., "Web-based Access to an Online Atlas of an Anatomy : The Digital Anatomist Common Gateway Interface", dated 1995, pp. 512-516, AMIA, Inc.

(Continued)

*Primary Examiner* — Krisna Lim
(74) *Attorney, Agent, or Firm* — Blakely, Sokoloff, Taylor & Zafman LLP

(57) ABSTRACT

According to one embodiment, a system is disclosed that includes a network, a server and a browser client coupled to the network. The browser client is operable to receive server documents from the server via the network. The system also includes a printer coupled to the network. The printer is operable to retrieve server documents to be printed from the server upon receiving a command from the browser client. In another embodiment, the browser is a Personal Digital Assistant (PDA) coupled to the network. The PDA is operable to receive server documents from the server via the network. In this embodiment, the printer is adaptable to retrieve server documents to be printed from the server upon receiving a command from the PDA.

37 Claims, 14 Drawing Sheets

U.S. PATENT DOCUMENTS

| | | | |
|---|---|---|---|
| 6,272,492 B1 * | 8/2001 | Kay .............................. | 707/10 |
| 6,324,565 B1 * | 11/2001 | Holt, III ....................... | 709/203 |
| 6,327,045 B1 | 12/2001 | Teng et al. | |
| 6,330,611 B1 | 12/2001 | Itoh et al. | |
| 6,377,983 B1 * | 4/2002 | Cohen et al. ................. | 709/217 |
| 6,397,246 B1 * | 5/2002 | Wolfe ........................... | 709/217 |
| 6,424,424 B1 | 7/2002 | Lomas et al. | |
| 6,446,109 B2 * | 9/2002 | Gupta ........................... | 709/203 |
| 6,446,111 B1 * | 9/2002 | Lowery ........................ | 709/203 |
| 6,799,297 B2 * | 9/2004 | Ackaret ........................ | 715/505 |
| 6,886,028 B1 * | 4/2005 | Matsuyama et al. .......... | 709/203 |
| 6,950,991 B2 * | 9/2005 | Bloomfield et al. .......... | 715/738 |
| 7,107,526 B1 * | 9/2006 | Weller .......................... | 715/206 |
| 7,143,420 B2 * | 11/2006 | Radhakrishnan ............. | 719/328 |
| 7,293,099 B1 * | 11/2007 | Kalajan ........................ | 709/230 |
| 2001/0003823 A1 * | 6/2001 | Mighdoll et al. ............. | 709/200 |

FOREIGN PATENT DOCUMENTS

JP          09-026972          1/1997

OTHER PUBLICATIONS

Kaashoek, M. Frans, et al., "Dynamic Documents: Mobile Wireless Access to the WWW", dated 1995, pp. 179-184, IEEE.

Goldberg, Ken, et al., "Desktop Teleoperation via the World Wide Web", IEEE International Conference on Robotics and Automation, dated 1995, pp. 654-659.

Kaneko, Makoto, "Internet Magazine", dated 1996, 7 Pages, No. 13, Impress Corporation, Japan.

Japanese Office Action for Japanese Patent No. 2006-263051, 4 Pages.

Japanese Office Action dated Feb. 13, 2009 JP Patent Application No. 2006-263051, 5 pgs.

Ken Goldberg, et al., "Desktop Teleoperations Via the World Wide Web," Proceedings of IEEE International Conference on Robotics and Automation, May 1995, vol. 1, pp. 654-659.

Makoto Kaneko, Internet magazine No. 13, Japan, Impress Corporation, Feb. 1, 1996, pp. 147-149.

Kamada, T.: "Demand for Networking in Embedded Devices;" "Interface" Magazine, Chapter 1, vol. 20, No. 12, (Dec. 1994), 14 pages, Kazuo Kambe, Tokyo, Japan.

* cited by examiner

Book from
http://www.aan.org/sigchi/chi97/proceed in gs/short-talk/index.html

Table of Contents

| | |
|---|---|
| Emotional Usability of Customer Interfaces - Focusing on Cyber Banking System Interfaces | 1 |
| URL:jki.htm. | 1 |
| Emotional Usability of Customer Interfaces - Focusing on Cyber Banking System Interfaces | 1 |
| ABSTRACT | 1 |
| KEYWORDS | 2 |
| INTRODUCTION | 2 |
| EXPERIMENTS WITH CYBER BANKING SYSTEMS | 3 |
| Experiment 1 | 3 |
| Experiment 2 | 4 |
| Experiment 3 | 4 |
| Experiment 4 | 6 |
| GENERAL DISCUSSION | 6 |
| REFERENCES | 7 |
| World Wide Web as Usability Tester, Collector, Recruiter | 7 |
| URL:ck.htm | 7 |
| World Wide Web as Usability Tester, Collector, Recruiter | 7 |
| ABSTRACT | 8 |
| Keywords | 8 |
| BACKGROUND - What is "Wildfire?" | 8 |
| WHAT WE WERE TESTING | 9 |
| How the Incaller portion of the system works | 10 |
| Why we used the Web/Net to accumulate test subjects | 10 |
| WE USED THE WEB/NET FOR: | 11 |
| A Known Hazard | 11 |
| THE TEST ITSELF | 11 |
| What we found out. | 12 |
| IDEAS/REDUCTION | 12 |
| But what if you want to test a GUI, not a VUI (Vocal User Interface)? | 13 |
| Notes on a Pattern Language for Interactive Usability | 14 |
| URL:gca.htm | 14 |
| Notes on a Pattern Language for Interactive Usability. | 14 |
| ABSTRACT | 14 |
| KEYWORDS | 14 |
| INTRODUCTION | 15 |
| PATTERNS AND PATTERN LANGUAGES | 16 |
| USABILITY PATTERNS | 16 |
| TYPES OF USABILITY PATTERNS | 17 |
| Simple Patterns | 17 |
| Intrinsic Patterns. | 18 |
| Circumstantial Patterns | 18 |
| FUTURE OPPORTUNITIES | 19 |
| ACKNOWLEDGEMENT | 19 |
| REFERENCES | 19 |
| Effective Product Selection in Electronic Catalogs. | 20 |
| URL:ps.htm. | 20 |
| Effective Product Selection in Electronic Catalogs | 21 |
| ABSTRACT | 21 |
| Keywords | 21 |
| INTRODUCTION | 22 |
| SYSTEM | 23 |
| METHOD. | 23 |
| Hypothesis | 23 |
| Test Procedure | 24 |
| RESULTS AND DISCUSSION | 25 |
| ACKNOWLEDGMENTS | 26 |
| REFERENCES | 26 |

Emotional Usability of Customer Interfaces - Focusing on Cyber Banking System Interfaces URL:jki.htm Cffl 97 Electronic Publications: Late-Breaking/Short Talks CHI 97  Prev Cffl 97 Electronic Publications: Late-Breaking/Short Talks Next

Emotional Usability of Customer Interfaces - Focusing on Cyber Banking System Interfaces

*Jinwoo Km, Joe Yun Moon*
*Cognitive Information Engineering Laboratory*
*Yonsei University*
*Seoul 120-749. Korea*
*Email: jinwoo@base.yonsei.ac.kr. jo@base.yonsei.ac.kr*

ABSTRACT

Emotions play a major role in the social interaction process with electronic commerce systems. This paper describes our attempts to design customer interfaces for cyber banking systems that can induce target emotions for cyber banking systems. Four experiments were conducted to identify the important emotive factors and design factors, and to establish and verify causal relations between the factors. Results indicate that it is possible to design customer interfaces that will elicit target emotions for the systems (e.g., trustworthiness).

KEYWORDS emotional usability, customer interface, trustworthiness

© 1997 Copyright on this material is held by the authors.

ABSTRACT
KEYWORDS
INTRODUCTION
EXPERIMENTS WITH CYBER BANKING SYSTEMS
    Experiment 1
    Experiment 2
    Experiment 3
    Experiment 4
GENERAL DISCUSSION
REFERENCES

INTRODUCTION

Until recently, study of human computer interaction has focused on designing artifacts to help users overcome their cognitive limitations, with little regard for the emotive aspect of the interface [3]. However, human computer interaction is inherently a social process; people invariably behave as if the computer were a social actor [4]. Emotions play an important role in social interaction processes through its close relation to social reasoning and decision making [2]. By providing information as to the emotional desirability of the options available, they reduce and limit reasoning to those that induce positive feelings [1].

In a recent study on emotion, films and slides were found to elicit common target emotions [2]. Computer interfaces can basically be considered as a collection of slides composed of diverse visual and auditory stimuli. Accordingly, computer interfaces also have the potential to elicit common emotions in their users. This has important implications for the design of customer interfaces in electronic commerce systems, because emotions play an important role in the social interaction process involved in commercial transactions. This study focuses on cyber banking systems and investigates the possibility of designing customer interfaces that elicit

2

FIG. 8B desirable emotions for the users of cyber banking systems.

EXPERIMENTS WITH CYBER BANKING SYSTEMS

This study consists of four experiments. In the first, the *emotional* factors that influence a user's overall impression of a visual interface is determined. The second experiment identifies the *design* factors that a user usually attends to in the visual interface. The third experiment *establishes* the relations between the emotional and design factors. Finally, the fourth *verifies* these causal relations.

Experiment 1

*Materials and Procedure.* The aim of the first experiment is the selection of a comprehensive set of emotive scales for measuring the emotions elicited by cyber banking interfaces. A variety of sources related to cyber banking systems was combed for the 318 bipolar terms used in this first study. The experiment was conducted in three group sessions of five to ten subjects, with a total of 25 subjects. Subjects were shown one cyber banking interface at a time and asked to indicate the intensity and direction of the feelings elicited by the interface on 7 point Likert scales. Eight interfaces representative of the different types of cyber banking systems were used, the order of which was counter-balanced for each of the three group sessions so as to prevent an ordering effect.

*Results and Discussion.* From the 318 scales, we identified 10 groups of closely related emotive terms through cluster analysis. From each of the 10 clusters, a group of experts in cyber banking systems selected a few differential scales representative of the domain specific emotions that are most important in cyber banking systems. As a result, forty bipolar scales (e.g., reliable-unreliable) were selected to be included in the final self-report questionnaire used in the following experiments.

Experiment 2

*Materials and Procedure.* Twenty-six interfaces through an extensive search of existing cyber banking systems in our attempts to include all different designs in the test material. The experiment was conducted in two group sessions of 30 subjects in total. Instructions for the task were the same as in the first experiment, with the exception of the free recall tests. Upon completion of the self-report questionnaire, the interface was hidden from view and subjects were asked to draw what they could remember of the interface. This was done at random intervals for a few selected interfaces during each session.

*Results and Discussion.* Subjects' drawings were analyzed to identify the most frequently recalled design items. The fourteen design factors that were identified from the drawings are shown in Table 1. A group of experts in cyber banking systems classified the identified design factors into four major groups : tide, menu, main clipart, and color. These represent the major design factors from a user's perspective for the cyber banking systems.

*Table 1. Design Factors of Cyber Banking Interfaces*

| Categories | Design Factors |
|---|---|

Values Title Format Bar, Clipart ... Graphics Included, Not Included Position Top, ... Menu Content Numbers & text in a box,... Form Square,.- Size Over 1/16 Main Clipart Format 3 Dimensional,... Size Over 1/2 total screen size,... Motion None, Simple animation... Color Color Tone Cool shades... Main color Pastel Colors- Background White covering over 1/2 ..... Brightness High...... Symmetry Stability of color tones....

Experiment 3

*Materials and Procedure.* The experiment was conducted in three group sessions of 123 subjects in total. The procedure employed was identical to that of the first experiment. Twelve cyber banking interfaces

*FIG. 8C*

XYZ Insurance Company  CONTRACT
*111 A Street*
*SiliValley, CA 90000*  *Example*

Insured | Agent

Ogawa | A. Sales Agent
321 Main S. | 123 Easy Street
Sendai 98765 | Your Town, 98765

Policy Number 46309171998.1046

Agreement to provide Insurance

This is a agreement between "XYZ Insurance" (*the Insurer*) and "Ogawa" (*the Insured*). Insurer agrees to provide the full coverage listed below to the Insured, of Sendai 98765, on smallCar beginning on Thursday. September 17.1998 10:46:27 AM PDT and extending for a period of one year in exchange for an annual premium of $1250.

Summary of coverage information

| Type of coverage | Covered Items | Deductible | Annual Premium |
| --- | --- | --- | --- |
| • Bodily injury<br>• Property damage<br>• Comprehensive<br>• Collision | small Car | 0 | 1250 |

Disclaimer

*This is just an example of what a contract might look like. The point is to show that the WebPrinter can format Web document and print it out onto paper in a nice fashion that meets the needs of the customers.*

*The PIA (Platforms for Information Appliances) software framework makes It easy to prototype and build office machines (Information Appliances) that meet customer needs with digital (Web) documents and provide customized solutions without traditional software programming*
If this were a real contract, there would be lots of small print here.

The undersigned hereby agrees to be bound by this contract to the extent of allowable by local laws and all the others legal language which would impact such a contract, including the policy statement booklet which should accompany this contract and be included by reference.

Signed: _____ 09/17/1998    _____ 09/17/1998
           Ogawa                              A. Sales Agent

METHOD AND APPARATUS FOR PROCESSING DOCUMENT REQUESTS AT A SERVER

This application is a continuation of a U.S. patent application Ser. No. 09/383,066, filed Aug. 25, 1999, now U.S. Pat. No. 6,738,841, which is a continuation-in-part application of a application entitled, "Method And Apparatus For Controlling A Peripheral", application Ser. No. 08/599,373, filed on Feb. 9, 1996, now U.S. Pat. No. 6,209,048.

FIELD OF THE INVENTION

The present invention relates to the field of printer peripheral devices used in conjunction with interconnected networks, such as the World Wide Web; more particularly, the present invention relates to directly controlling a printer via existing protocols used to access documents on such a network.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low-end personal computers to high-end super computers are coupled to the Internet.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mail.

In 1989, a new type of information system known as the World-Wide Web ("the Web") was introduced to the Internet. Early development of the Web took place at CERN, the European Particle Physics Laboratory. The Web is a wide-area hypermedia information retrieval system aimed to give wide access to a large universe of documents. At this time, the Web was known to and used by the academic/research community only. There was no easily available tool that allows a technically untrained person to access the Web.

In 1993, researchers at the National Center for Supercomputing Applications (NSCA) released a Web browser called "Mosiac" that implemented a graphical user interface (GUI). Mosiac's graphical user interface was simple to learn yet powerful. The Mosiac browser allows a user to retrieve documents from the Web using simple point-and-click commands. Because the user does not have to be technically trained and the browser is pleasant to use, it has the potential of opening up the Internet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "Hypertext Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

Portions of documents displayed on the Web contain hypertext links. The hypertext links link graphics or text on one document with another document on the Web. Documents containing hypertext links are created prior to their "publishing" on the Web. That is, a document that is to be published is provided to a server which creates the document and, essentially, publishes the document by permitting its access by others on the Web. Each hypertext link is associated with a Universal Resource Locator (URL) that identifies and locates a document on the Web. When a user selects a hypertext link, using, for instance, a cursor, the graphical browser retrieves the corresponding document(s) using a URL(s).

By removing the economic barriers associated with printing and distributing (multi-media) documents, the Web allows individuals to become "publishers". Many of these individuals are not information publishers, and, do not require high sophistication and complexity in publishing their information. To that extent, individuals utilizing the Web need to be able to create Web documents as well as retrieve information. Currently, tools for capturing images or other media do not perform the function seamlessly when attempting to integrate the captured information into Web documents. Any information captured must be converted into a hypertext document by a separate server.

Furthermore, because the Web represents a global standard for the exchange of documents, it may become the common currency in which companies and individuals publish both their external and internal documents. As the race to provide Internet (Web) services to every desktop and home continues, it is predictable that the number of "publishers" will continue to grow quickly. Similarly, the trend towards high quality, multi-media productions will continue to grow. Therefore, it is predictable that a great need for tools to create multi-media Web documents may exist. Many of these tools will be software applications, such as word processors.

Peripheral devices are typically connected to the Web to facilitate user interaction with the Web. In prior art systems, peripheral devices are used for a variety of specific application functions. For instance, a printer, is used to print data, while a scanner is used to scan data. These peripherals are usually connected to a host computer, via a bus, which controls the use of the peripheral. A typical system is shown in FIG. 1. Referring to FIG. 1, a computer 101 typically includes an application 102 which makes calls to a driver 103 of printer 104 that is running on the host computer 101, thereby causing control information and signals to be sent over bus 105 to printer 104 to control its operation. Thus, access to printer 104 is only through host computer 101 and its driver 103. Therefore, if an individual wishes to print a document, the individual must communicate their wishes to the computer, which then causes the printer to perform the desired function. If an individual does not have access to a host-computer with the proper driver, then the printer cannot be controlled. Moreover, if an individual is at a remote site, one may not have access to the host computer, yet would still like to control a printer. Therefore, there is a need to be able to control printers directly, without relying on a host as an interface. Furthermore, it is desirable to allow the same control from a remote location.

SUMMARY OF THE INVENTION

According to one embodiment, a printer coupled to and for use with a network providing access to interconnected, online documents in response to document requests is disclosed. The printer includes a printer server for handling requests from one or more browser clients. The printer server is independent of the one or more browser clients

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 8a illustrates one embodiment of a table of contents page printed at a printer;

FIG. 8b illustrates one embodiment of a page from a book of documents printed at a network printer;

FIGS. 8c illustrates one embodiment of a page from a book of documents printed at a network printer;

FIG. 11 illustrates one embodiment of a contract document printed at a network printer.

DETAILED DESCRIPTION

Figure 1:
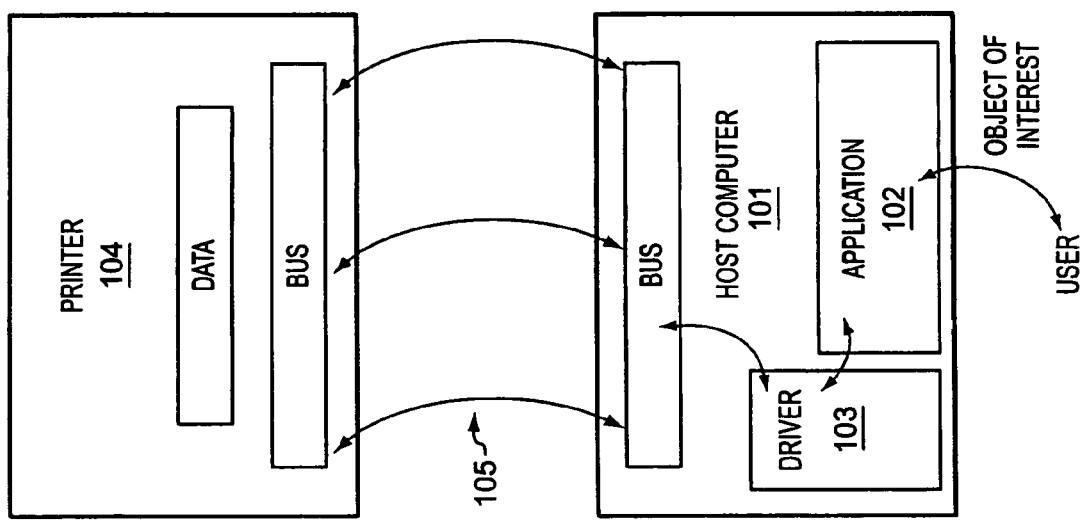
FIG. 1 is a prior art computer system with a host computer and a printer.

A method and apparatus for creating electronic documents and controlling printer peripherals is described. In the following detailed description of the present invention numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The programs including executable instructions may be executed by one or more programming devices (e.g., a central processing unit (CPU), processor, controller, etc.) in one or more personal computer systems, servers, workstations, etc.

Overview

A network printer is described that is coupled to a network and is able to respond to requests from the network. In one embodiment, the requests are associated with the World Wide Web (the WWW). The printers act as World Wide Web (WWW) servers. That is, printers are directly coupled to a local area network (LAN) or wide area network (WAN) and "serve" data, such as images or other multi-media objects, that they capture or create to requesting agents on the network.

In one embodiment, the printer may print a document requested by a user or render a print view image or display a view page on a browser client. In addition, the printer may arrange and print a compound document from hypertext linked documents that are located within a received document.

In one embodiment, the printer uses a hypertext transfer protocol ("HTTP") to communicate over the network with clients; such clients also communicate with the printer using the hypertext transfer protocol. This printer and these clients act as an HTTP server and HTTP clients respectively.

In one embodiment, the printer includes a processor and a memory and a computer readable medium, such as a magnetic ("hard disk") or optical mass storage device, and the computer readable medium of the printer contains computer program instructions for printing, rendering and transmitting the data from the printer to the client's systems. The clients in the system will typically include a client processor and a memory and a computer readable medium, such as a magnetic or optical mass storage device, and the computer readable medium of the client contains computer program instructions for receiving data from the printer and for storing the data at the client.

An Exemplary Embodiment of a Printer

Figure 2:
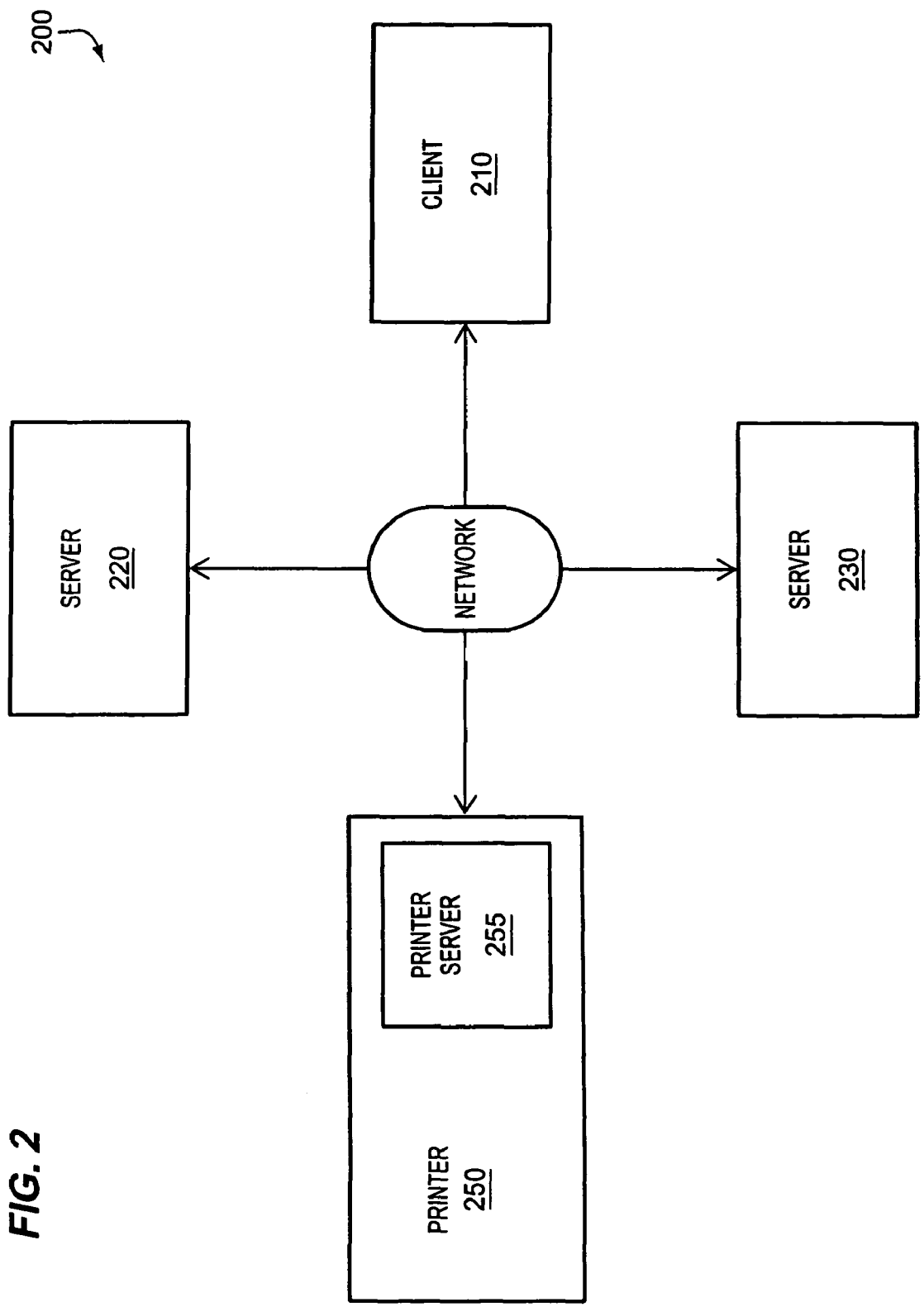
FIG. 2 is a block diagram of one embodiment of a network printer in a network.

FIG. 2 is a block diagram of one embodiment of a printer 250 in a network 200. Network 200 also includes client 210 and servers 220 and 230. In one embodiment, network 200 comprises the Internet. However, other embodiments are not limited to retrieving and publishing documents on the "World Wide Web" or the "Internet." The teachings disclosed herein may be applied to various networks, data and document storage and archival facilities, or other types of client/server systems that have documents or other information available upon request.

Client 210 requests documents from servers coupled to the network. Client 210 may comprise a program (e.g., a browser) that permits a user to access documents over network 200 that are located on servers 220 and 230. Servers 220 and 230 access and provide data to client 210 over the network 200 to a user in response to requests from the user via client 220. Printer 250 may be used to print a document requested by a user at client 210, as well as to render a print view image for display as part of a view page on the browser residing in client 210. Printer 250 includes printer server 255 that emulates a network server and may be a destination for HTTP PUT requests for storage or output of documents and HTTP POST requests for configuration forms. Printer server 255 may also emulate a network client, being the source for HTTP GET requests (for documents to be output) and PUT or POST requests (for document input). In addition, printer server 255 might also serve as a proxy.

According to one embodiment, printer server 255 is a printer agency that is used to provide a document-centric interface to a printer 250. Unlike a typical printer, a printer agency can transform documents or requests for documents (e.g., rendering a document in order to provide additional features). Thus, an agency represents a complex network client that operates on behalf of a user peripheral agency or on behalf of peripheral (many users) to manage input devices, output devices, storage devices as well as computational resources. The agency application is not described in further detail in order not to obscure the present invention. Nevertheless, the agency application performed by printer server 255 operates according to a protocol described in a application entitled, "Document Agency System", application Ser. No. 08/718,858, filed on Sep. 24, 1996, issued Jun. 4, 2000 as U.S. Pat. No. 6,012,083, and incorporated herein by reference.

If a user requests, via client 210 or otherwise, that an HTML document be printed on printer 250, the user sends a request for the document to printer driver 255 within printer 250. Printer driver 255 obtains the document from a server 220 or 230 and renders it as it might appear on printer 250 (or a low-resolution version of the rendering).

Figure 3B:
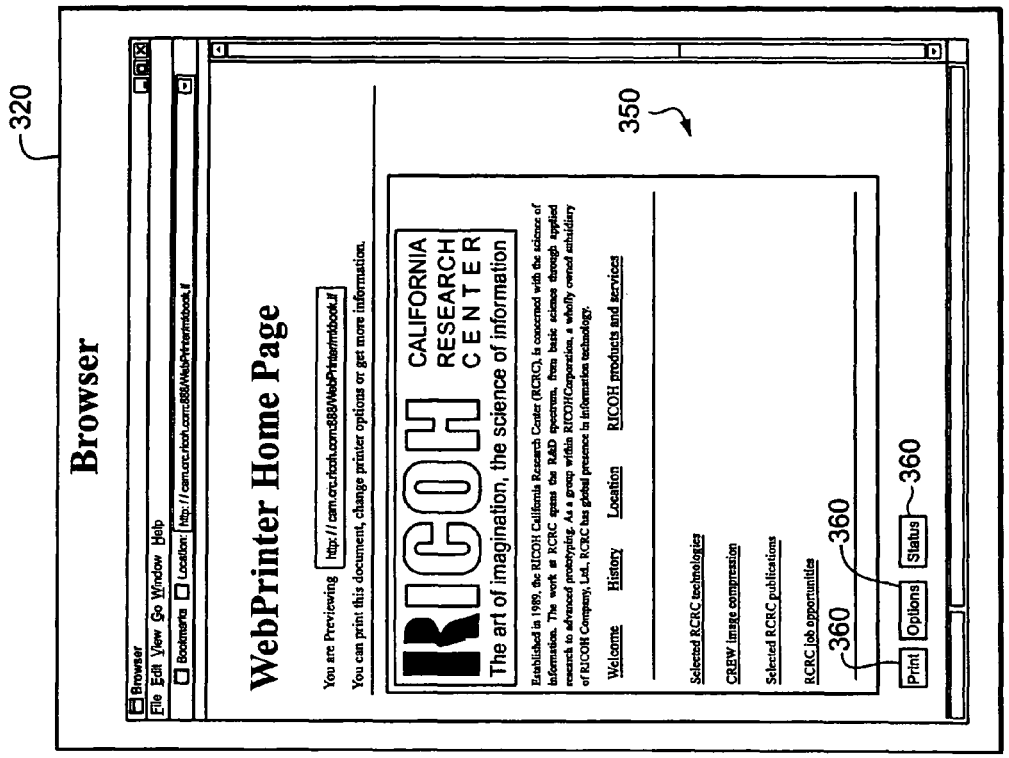
FIG. 3b illustrates one embodiment of a print view page of a document displayed on a browser.
Figure 3A:
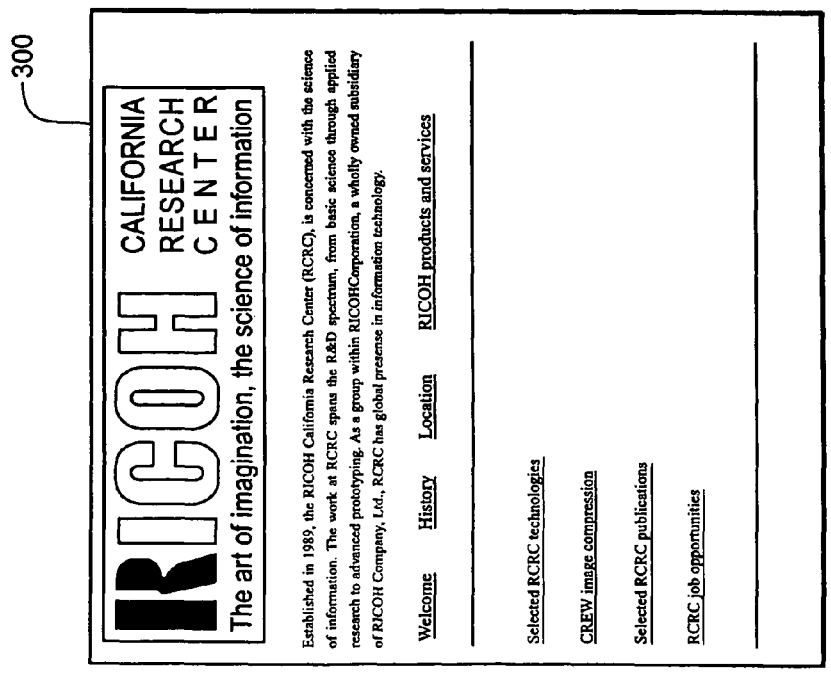
FIG. 3a illustrates a document printed at the network printer.

FIG. 3a illustrates one embodiment of a document 300 printed at printer 250. Printer driver 255 also attaches control buttons to the retrieved document and transmits the print view version of the document to the user at client 210. FIG. 3b illustrates one embodiment of a print view page 350 of a document displayed on a browser 320 residing in client 210. View page 350 includes control buttons 360 labeled "PRINT", "OPTIONS", and "STATUS". The "PRINT" button contains a tag that causes printer server 255 to transmit the document for download to the digital hardware and print engine components of printer 250. The "OPTIONS" and "STATUS" buttons-cause printer server 255 to serve up an option selection form and a printer status page, respectively.

In one embodiment, printer server 255 communicates using standard protocols. Accordingly, it is not necessary that all client and servers in network 200 share a common programming language, interface or operating system. Thus, printer server 255 may interact with client 210 even if they support different platforms. Moreover, client 210 may interact with printer server 255 even though client 210 is unaware of printer server 255. Further, printer server 255 may handle additional configuration tasks such as having the user select a printer by presenting the user with a network page showing printer locations and including a hypertext map of the printers.

As shown in FIGS. 3a and 3b, printer server 255 formats print view page 350 with controls not found on the original document, including the button controls 360 discussed above and a control indicating the URL of the page being viewed. The rendering function of printer server 255 provides an accurate print view. Accordingly, it is not necessary for manufacturers of browsers included with client 210 to code printer drivers for many different printers since functionality can change without change to the browser or host software.

Documents received at printer 250 may be in an HTML format upon arriving at printer server 255, enabling printer server 255 to perform document handling operations. According to one embodiment, documents are transformed from the HTML format to a page description using a template that specifies how each element of a document is to be rendered. Such operations are possible because a document to be printed is presented to printer server 255 in the form of a document, as opposed to rendering instructions such as a Postscript® file or a binary file. Therefore, printer server 255 is capable of interpreting the document.

One such operation is a user configuration at printer server 255 that renders documents as provided by the user, instead of the author of the document. For example, a user may specify that printer server 255 organize and print compound documents (e.g., a book) received at printer server 255. A user may select a book format by specifying that documents to be printed should be followed by one or more levels of linked documents. Printer server 255 may also create new documents as part of the document stream, such as a table of contents.

In one embodiment, client 210 may transmit a document request directly to server 220 and 230. Subsequently, the servers 220 and 230 transmits the document data to printer server 255 where the document handling operations and formatting are implemented. In other embodiments, document handling operations and formatting may be implemented at other servers (e.g., servers 220 or 230) prior to being received at printer server 255. For example, requests from client 210 may be received at server 220 and 230 wherein all of the document handling and formatting operations are performed prior to transmitting the document data to printer 250 for download.

Figure 4:
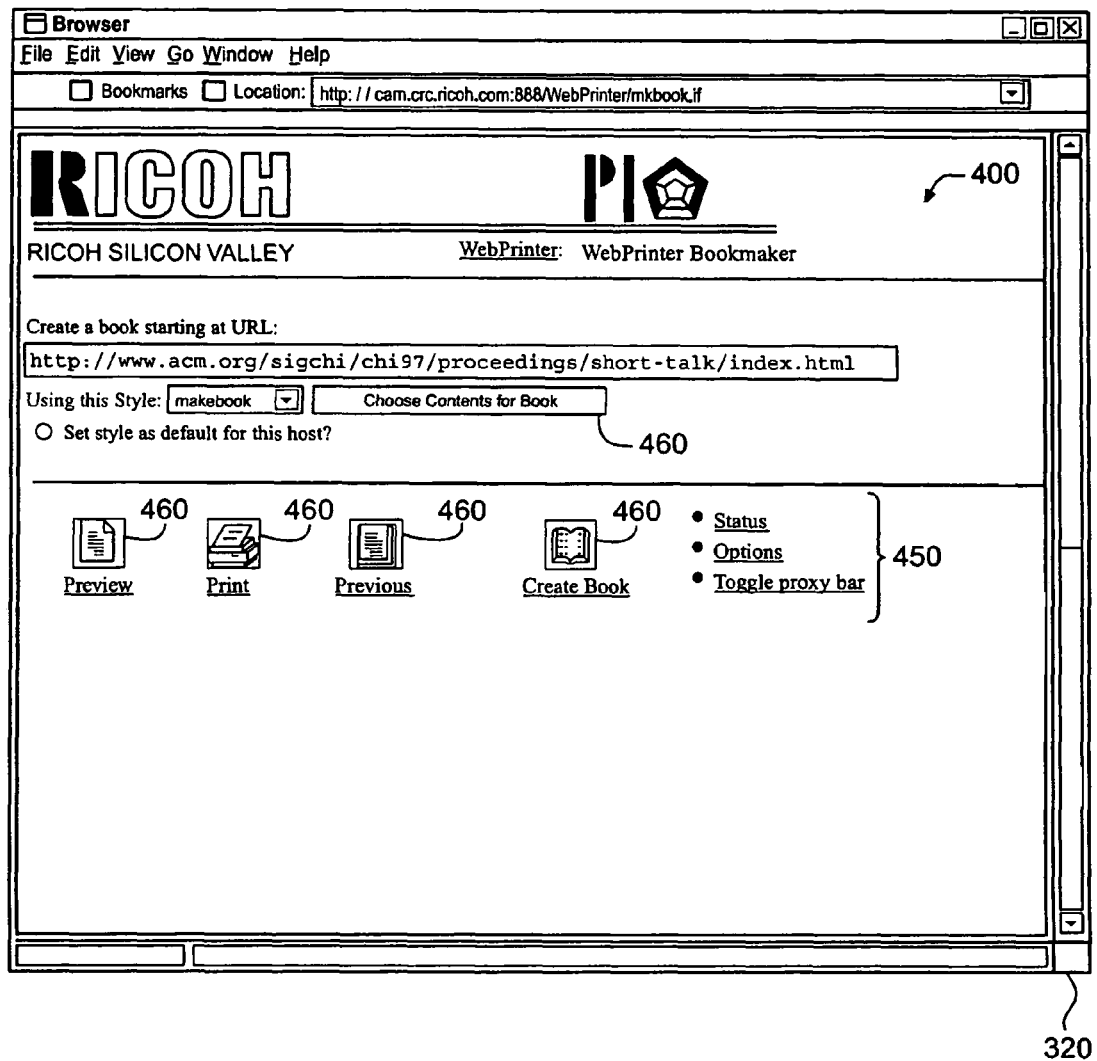
FIG. 4 illustrates one embodiment of a bookmaker page displayed on a browser.

FIG. 4 illustrates one embodiment of browser 320 displaying a "bookmaker" page 400. The bookmaker option is a document handling operation performed at printer server 255. Bookmaker page 400 includes control buttons 460 labeled "PREVIEW", "PRINT", "PREVIOUS", "CREATE BOOK", "STATUS", "OPTIONS", "TOGGLE PROXY BAR" and "CHOOSE CONTENTS FOR BOOK". The "PREVIEW" button causes a view of pages selected by the user to be printed at printer 250 to be displayed on browser 320. The "PRINT" button contains a tag that causes printer server 255 to transmit the document for download to the digital hardware and print engine components of printer 250. The "PREVIOUS" button provides access to previously rendered/printed documents.

The "CREATE BOOK" button causes printer server 255 to organize selected hypertext links (links) included in a URL provided by the user. The "STATUS" and "OPTIONS" buttons cause printer server 255 to serve up a printer status page and an option selection form, respectively. The "CHOOSE CONTENTS FOR BOOK" button permits a user to select the links within the provided URL that are to be included in the book. The "TOGGLE PROXY BAR" turns the insertion of a control bar on and off if browser 320 is using printer server 255 as a proxy server, printer server 255 may insert a control bar at the top of each document page. The control bar provides one click access to printing, book creation and/or other functions without having to cut and paste a URL.

Figure 5A:
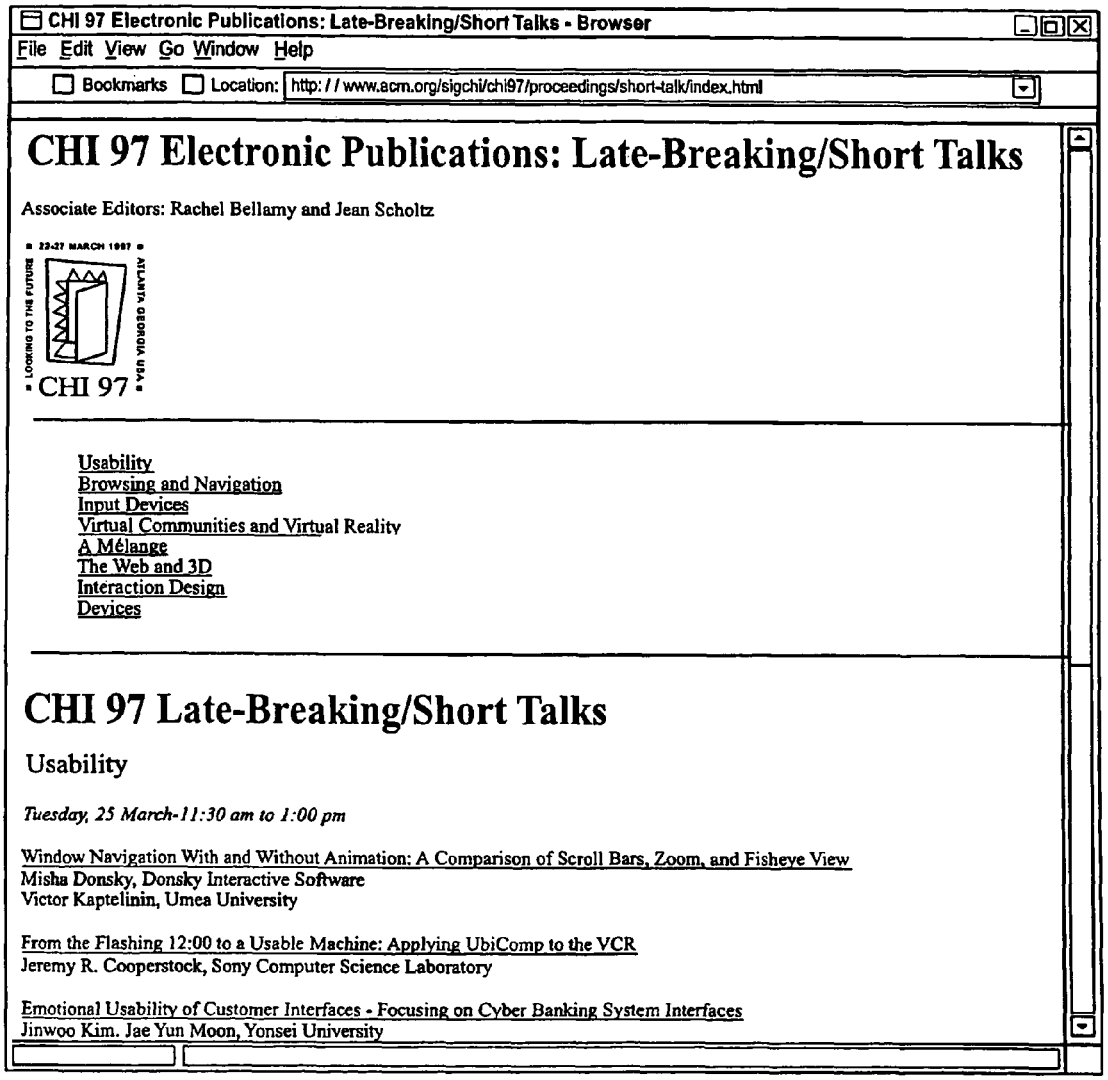
FIG. 5a illustrates one embodiment of the contents of a Web page.
Figure 5B:
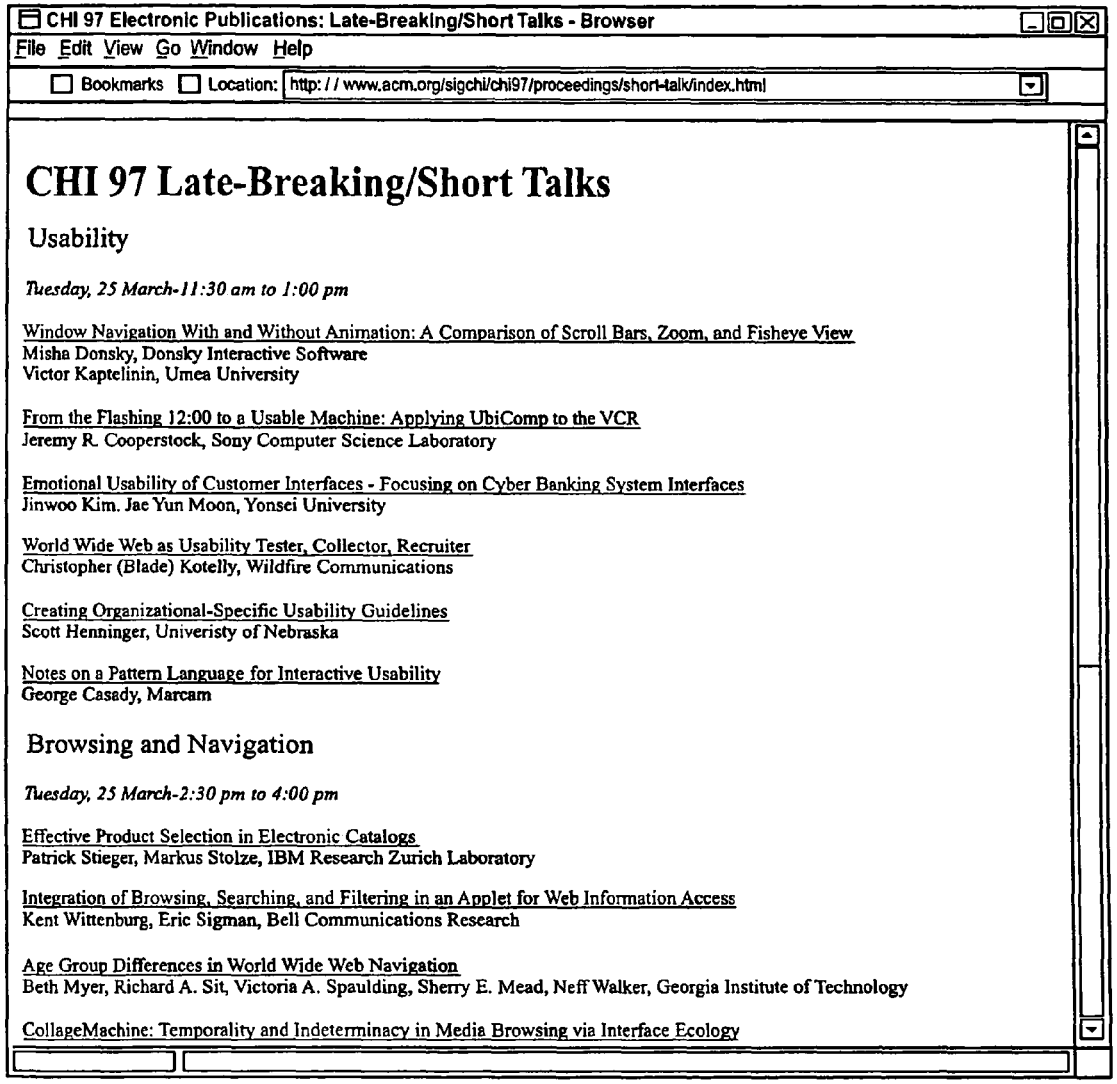
FIG. 5b illustrates another embodiment of the contents of a Web page.

Bookmaker page 400 also includes a control that allows the user to provide the web page (or pages) from which the book will be created. For example, a book may be created from a web page at the URL "WWW.acm.org/sigchi/chi97/proceedings/short-talk/index.html", as shown at bookmaker page 400. FIGS. 5a and 5b illustrate the actual contents of the above-mentioned URL that may provide material to create a book. Referring to FIG. 5a, a web page including "CHI 97 Electronic Publications: Late-Breaking/Short Talks" is displayed on browser 320. The CHI 97 page includes various links to other web pages. FIG. 5b shows the CHI 97 page after the browser 320 display has been scrolled down.

Figure 6:
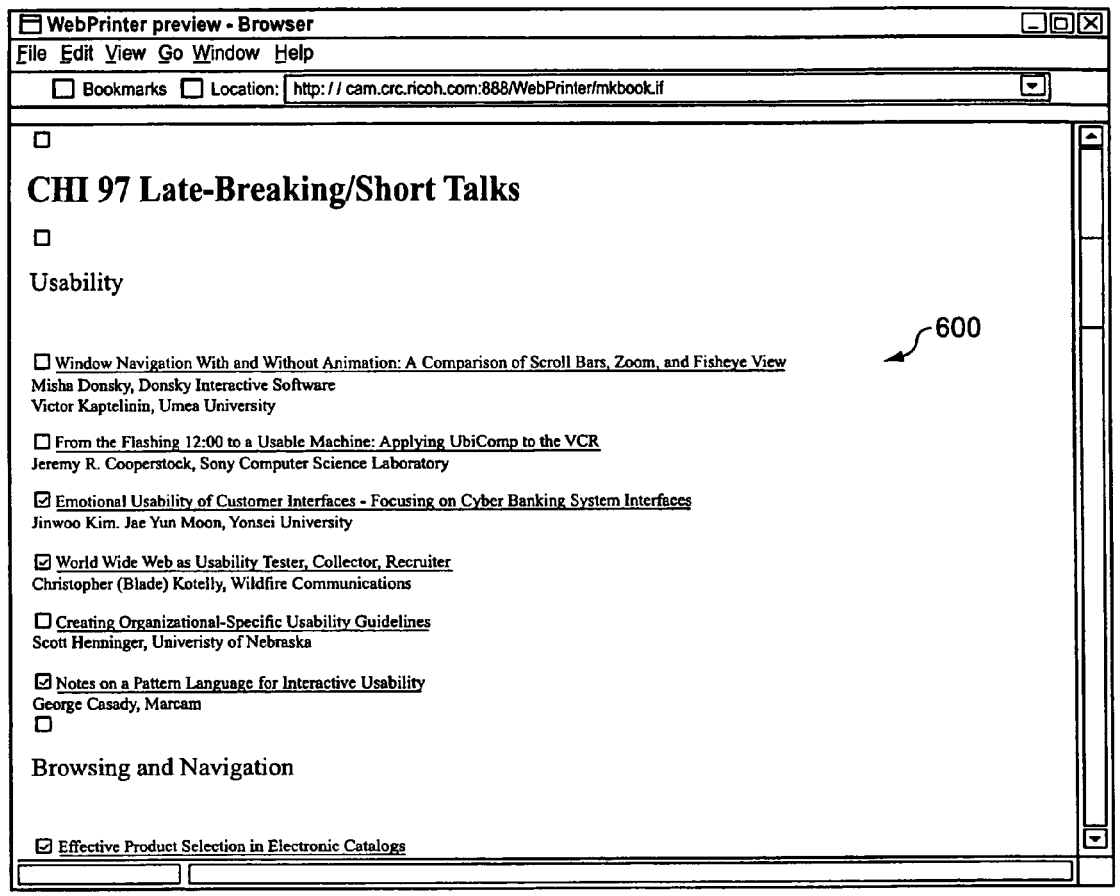
FIG. 6 illustrates one embodiment of a book selection page displayed on a browser.

FIG. 6 illustrates one embodiment of a book selection page 600 displayed on browser 320 after the selection of the "CHOOSE CONTENTS FOR BOOK" button. Upon selection of the "CHOOSE CONTENTS FOR BOOK" button, print server 250 fetches the web document with the URL specified in bookmaker page 400 (e.g., the CHI 97 page) and renders the document based upon a predetermined format. Selection page includes controls that allow a user to select links that are to be included in the created book. For example, book selection page 600 shows the "Emotional Usability of Customer Interfaces . . . ", "World Wide Web as Usability Tester. . . ", "Notes on Pattern Language . . . ", and "Effective Product Selection in Electronic Catalogs" links of the CHI 97 web page shown in FIGS. 5a and 5b as being selected to be included in a book.

Figure 7:
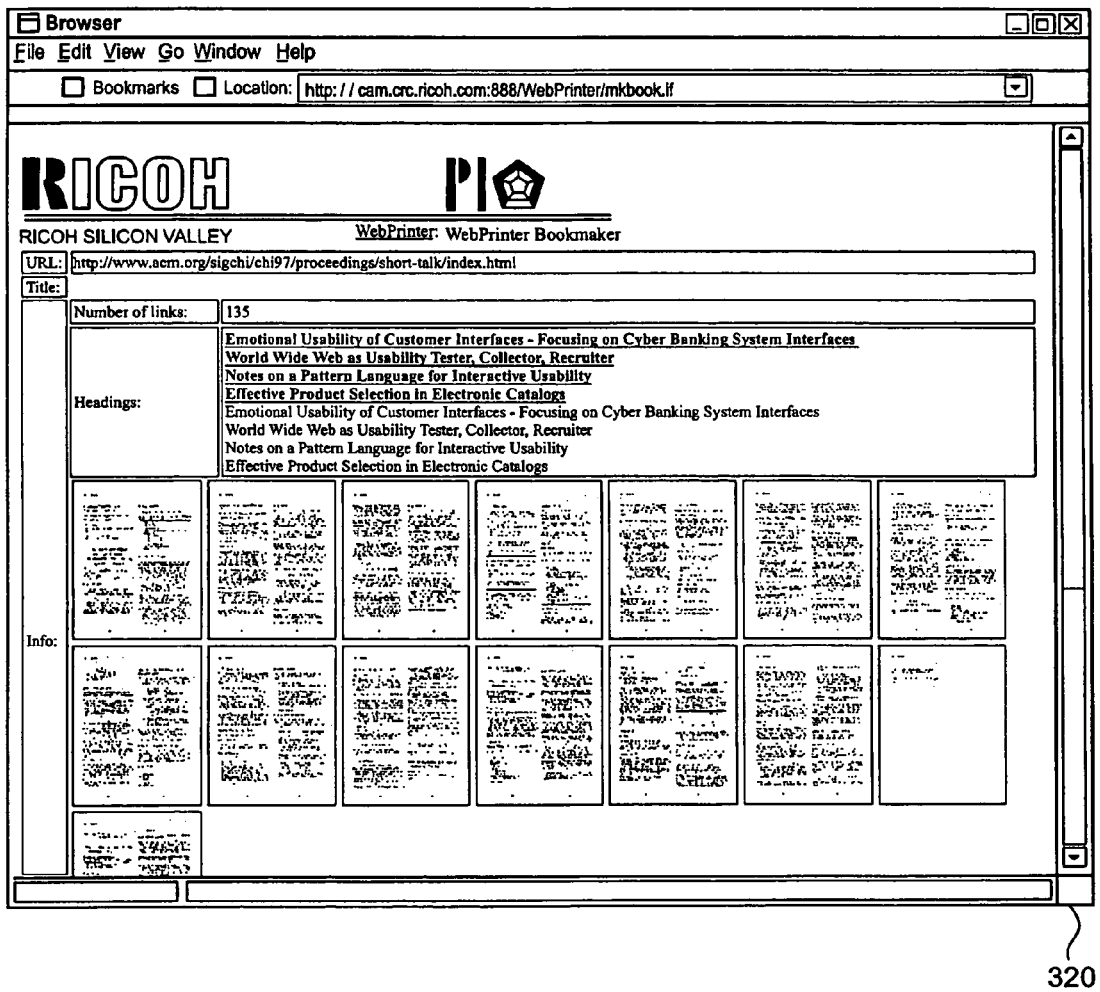
FIG. 7 illustrates one embodiment of a book view page displayed on a browser.

After selection at book selection page 600, the selection data is transmitted to printer driver 255. Printer driver 255 waits for further instructions from client 210 on how to use the selected links. FIG. 7 illustrates one embodiment of a book view page 700 displayed on browser 320. View page 700 is displayed after the selecting the "PREVIEW" button on create book page 400. View page 700 displays pages of links selected by a user to be printed in a book.

In addition, view page 700 displays a listing of the links from which the book document is created. Referring to FIG. 7, view page 700 displays print view pages of the CHI 97 web page links selected at book selection page 600. Further, the "Emotional Usability of Customer Interfaces . . . ", "World Wide, Web as Usability Tester . . . ", "Notes on Pattern Language . . . ", and "Effective Product Selection in Electronic Catalogs" links are listed in view page 700.

FIGS. 8a-8c illustrate one embodiment of a book of documents printed at printer 250 after a user has selected the "PRINT" button on page 400. According to one embodiment, printer server 255 creates a table of contents with the downloaded document. Referring to FIG. 8a, one embodiment of a table of contents page 800 printed at printer 250 is shown. The headings on table of contents page 800 correspond with links selected in creating the book.

Using the CMI 97 web page as an example, the "Emotional Usability of Customer Interfaces . . . ", "World Wide Web as Usability Tester . . .", "Notes on Pattern Language . . . ", and "Effective Product Selection in Electronic Catalogs" links are shown beginning at pages 1, 7, 14 and 20, respectively, of the book. In addition, table of contents page 800 lists the URL from which the book was created (e.g., the URL "WWW.acm.org/sigchi/chi97/proceedings/short-talk/index.html" page). Referring to FIGS. 8b and 8c, pages from the "Emotional Usability of Customer Interfaces . . . " link are included on pages 1-4 of the book.

Figure 9:
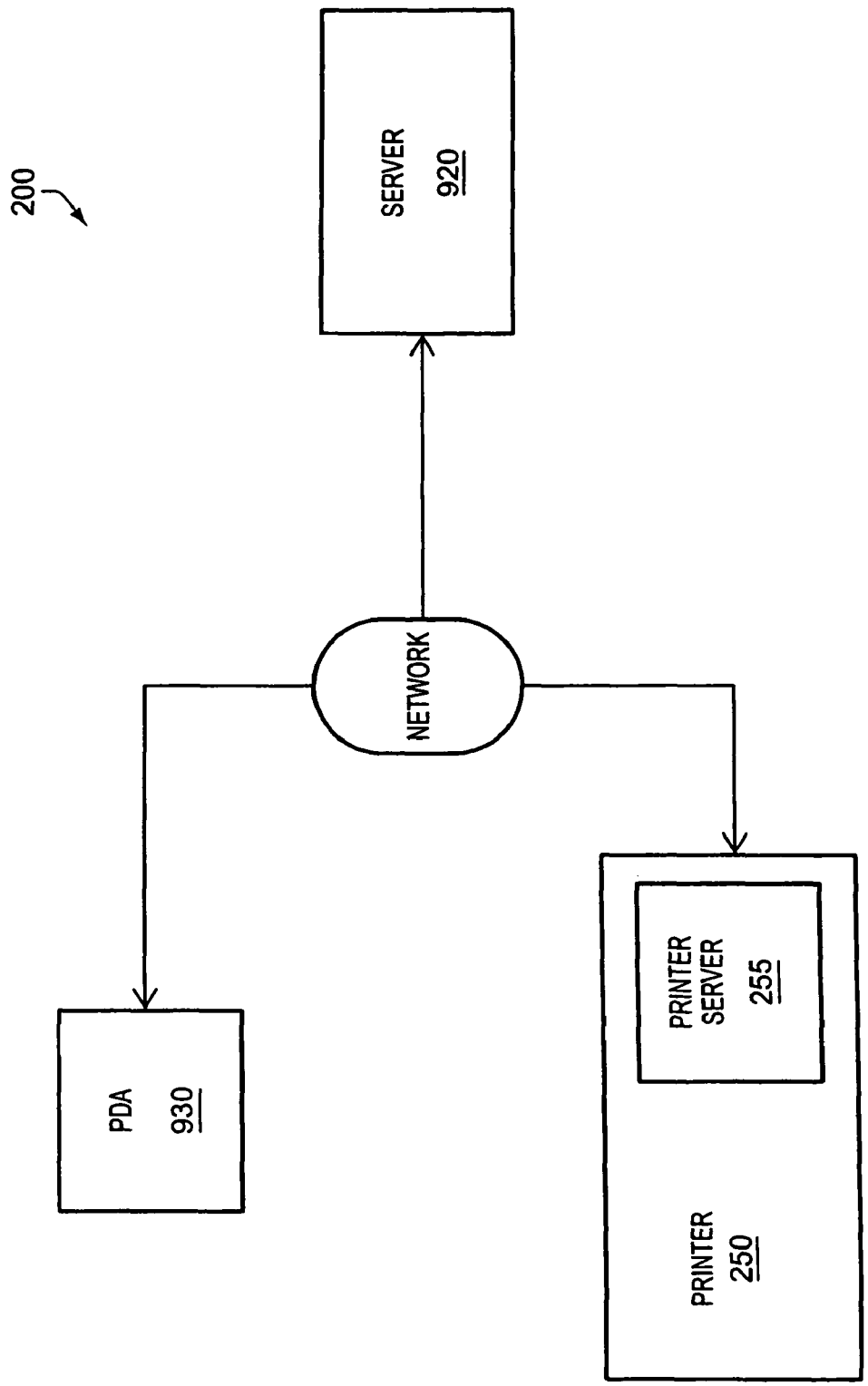
FIG. 9 is a block diagram of another embodiment of a network printer in a network.

FIG. 9 is a block diagram of another embodiment of printer 250 in network 200 wherein network 200 also includes a server 920 and a personal digital assistant (PDA) 930 implemented as a web browser. Server 920 provides data to PDA 930 and printer 250 over network 200 to a user in response to requests from the user via PDA 930. PDA 930 may be a small mobile hand-held device that provides computing and information storage and retrieval capabilities for personal or business use. In one embodiment, PDA 930 uses a Microsoft Windows CE®-based operating system. However, one of ordinary skill in the art will appreciate that PDA telephone 100 may function using other operating systems (e.g., the Palm™ operating system of 3Com Corp.). Additionally, the operating system of PDA 930 includes a browser that facilitates network 200 access.

Figure 10:
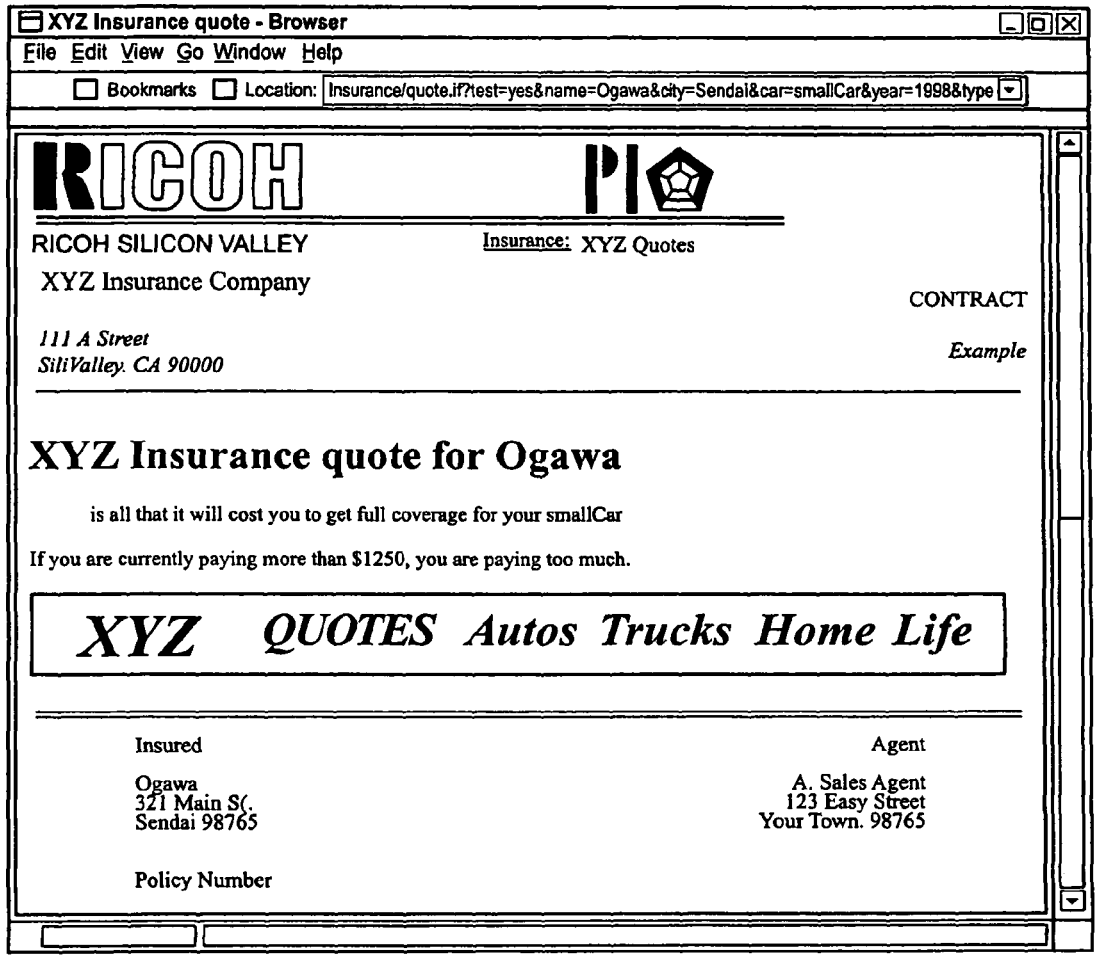
FIG. 10 illustrates one embodiment of a sales quote document displayed at a personal digital assistant (PDA)

In one embodiment, PDA 930 accesses server 920 and printer 250 over network 200 via a wireless connection, such as a radio frequency (RF) modem or an Institute of Electrical and Electronics Engineers (IEEE) P802.11 standard modem. Alternatively, PDA may access server 920 and printer 250 via a modem included within PDA 930. Further PDA 930 may receive data from server 920 used to produce business sales quotes for products and services. FIG. 10 illustrates one embodiment of a quote 1000 document displayed at PDA 930. Server 920 may comprise a business' home Web page that a user may access in order to retrieve the quote.

The quote may include information previously provided to server 920 (e.g., clients address, the PDA 930 user's name, etc.) from PDA 930. Referring to FIG. 10, quote 1000 is from an XYZ insurance company to Ogawa for insurance coverage of a small car quoted by A. Sales Agent for $1250. Quote 1000 also includes the address information for both XYZ and Ogawa, as well as the policy number.

Further, printer 250 may be used to print a contractual document (contract) based upon quote 1000 received. Printer server 255 is also included within printer 250 in this embodiment. In other embodiments, printer server 255 may be a separate portable device carried by a sales person that may be coupled to printer 250. As described above, printer server 255 is a printer agency that may be used to provide a document-centric interface to printer 250.

If a user requests, via PDA 930 or otherwise, that a contract based on a quote (e.g., quote 1000) be printed on printer 250, the user sends a request for the contract to printer driver 255. Printer driver 255 retrieves the document data from server 920, performs the appropriate formatting of the document data and transmits the document data to the digital hardware and print engine components of printer 250 where the contract is printed. For instance, FIG. 11 illustrates one embodiment of a contract 1100 printed at printer 250. Contract 1100 document includes the standard terms of the agreement between XYZ and Ogawa including the data provided by PDA 930 to create quote 1000. For example, the policy number from quote 1000 is included in contract 1100 and A. Sales Agent is listed as the agent.

From the above description, printer 250, in one embodiment, permits a client user to print a document without having to be concerned with whether the client includes the necessary print drivers. Moreover, printer 250 enables printing from a site that is remote from a printer. In another embodiment, printer server enables a salesperson to print documents from a PDA without interacting directly with printer 250. Specifically, the salesperson may retrieve quotes and generate contracts for products and/or services while visiting in a customer or clients office.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a method and apparatus for generating printouts from network/markup language documents has been described.

I claim:

1. An apparatus, comprising:
   a server to receive one or more requests from one or more clients over a network, to retrieve one or more electronic documents, specified by the one or more requests, from another server separated from the server over the network, and to transmit the retrieved one or more electronic documents to the one or more clients over the network in response to the one or more requests, wherein the server is further configured to control printing of the one or more electronic documents at the server by transmitting the one or more electronic documents to a print engine component associated with the server.

2. The apparatus of claim 1, wherein the server generates page descriptions corresponding to contents of the one or more electronic documents based upon the one or more requests received from the one or more clients.

3. The apparatus of claim 1, wherein the server formats the retrieved one or more electronic documents prior to transmitting the one or more electronic documents to the one or more clients to be viewed.

4. The apparatus of claim 3, wherein the server formats the retrieved one or more electronic documents as one or more images, wherein the one or more images of the retrieved one or more documents are transmitted to the one or more clients over the network.

5. The apparatus of claim 1, wherein at least one of the one or more clients comprises a personal digital assistant (PDA).

6. The apparatus of claim 5, wherein the PDA is coupled to the network wirelessly.

7. The apparatus of claim 1, wherein the one or more electronic documents are in Hypertext Markup Language (HTML) format, and wherein the server transforms the HTML format to generate page descriptions corresponding to contents of the one or more electronic documents based upon the one or more requests received from the one or more clients, wherein the server transforms the HTML format to page descriptions using a template that specifies how each element of the particular document is to be rendered.

8. An apparatus, comprising:
   a server to receive one or more requests from one or more clients over a network, to retrieve one or more electronic documents, specified by the one or more requests, from another server separated from the server over the network, and to transmit the retrieved one or more electronic documents to the one or more clients over the network in response to the one or more requests, wherein the server formats the retrieved one or more electronic documents prior to transmitting the one or more electronic documents to the one or more clients to be viewed, wherein the server adds one or more control buttons to at least one of the retrieved one or more electronic documents prior to transmitting the one or more electronic documents to the one or more clients, wherein the one or more control buttons, when activated within the at least one electronic document, enable a user of the one or more clients to interact with the server.

9. An apparatus, comprising:
   a server to receive one or more requests from one or more clients over a network, to retrieve one or more electronic documents, specified by the one or more requests, from another server separated from the server over the network, and to transmit the retrieved one or more electronic documents to the one or more clients over the network in response to the one or more requests, wherein the server formats the retrieved one or more electronic documents prior to transmitting the one or more electronic documents to the one or more clients to be viewed, wherein the server generates a compound electronic document derived from one or more additional electronic documents accessed by the server via one or more hypertext links included within the one or more electronic documents received from another server.

10. The apparatus of claim 9, wherein the server further generates a table of contents for the compound electronic document as a part of a single electronic document suitable to be printed.

11. A method, implemented by a first server programmed to perform the following, comprising:
   retrieving by the first server a first electronic document from a second server separated from the first server over a network in response to a request received from a client over the network;
   transmitting the retrieved first electronic document by the first server to the client over the network for viewing; and
   controlling printing of the first electronic document at the first server by transmitting the first electronic document to a print engine component associated with the first server.

12. The method of claim 11, further comprising formatting the retrieved first electronic document according to a format specified by the request of the client prior to transmitting the first electronic document to the client.

13. The method of claim 12, further comprising adding one or more control buttons to the first electronic document, wherein the one or more control buttons, when activated within the first electronic document, enable a user of the client to interact with the first server.

14. The method of claim 12, further comprising:
   retrieving a second electronic document from a location referenced via a link within the first electronic document; and organizing the first and second electronic documents to form a compound electronic document.

15. The method of claim 14, further comprising adding a table of contents associated with the contents of the compound electronic document.

16. The method of claim 15, further comprising transmitting the compound electronic document to the client over the network.

17. The method of claim 14, further comprising transmitting the second electronic document to the client over the network in response to an input via an activation of the link within the first electronic document.

18. The apparatus of claim 11, wherein the client comprises a personal digital assistant (PDA).

19. The apparatus of claim 18, wherein the PDA is coupled to the network wirelessly.

20. A non-transitory machine-readable storage medium storing executable code to cause a machine to perform a method, the method comprising:
   retrieving at a first server a first electronic document from a second server separated from the first server over a network in response to a request received from a client over the network;
   transmitting the retrieved first electronic document from the first server to the client over the network for viewing; and
   controlling printing of the first electronic document at the first server by transmitting the first electronic document to a print engine component associated with the first server.

21. A peripheral, comprising:
   a processor;
   a memory coupled to the processor;
   a print engine component coupled to the processor; and
   a process, when executed from the memory, causes the processor to
      retrieve a first electronic document from a server over a network in response to a request received from a client over the network,
      transmit the retrieved first electronic document to the client over the network for viewing; and
      control printing of the first electronic document at the first server by transmitting the first electronic document to a print engine component associated with the first server.

22. A method, implemented by a computing device programmed to perform the following, comprising:
   transmitting a request to a first server over a network for a first electronic document;
   receiving the first electronic document from the first server over the network, wherein the first electronic document is retrieved by the first server from a second server separated from the first server over the network in response to the request;
   retrieving a second electronic document from a location referenced via a link within the first electronic document; and
   organizing the first and second electronic documents to form a compound electronic document.

23. The method of claim 22, wherein the compound electronic document is printed at the first server.

24. The method of claim 22, further comprising specifying within the request a format for the compound electronic document, wherein the compound electronic document is formatted by the first server according to the format specified within the request.

25. The method of claim 24, wherein the compound electronic document comprises one or more control buttons added by the first server, and wherein the method further comprises interacting with the first server via an activation of the one or more control buttons within the first electronic document.

26. The method of claim 22, wherein the compound electronic document includes a table of contents associated with the contents of the compound electronic document.

27. The method of claim 22, wherein the network is a wireless network.

28. A non-transitory machine-readable storage medium storing executable code to cause a machine to perform a method, the method comprising:
   transmitting a request to a first server over a network for a first electronic document;
   receiving the first electronic document from the first server over the network, wherein the first electronic document is retrieved by the first server from a second server separated from the first server over the network in response to the request;
   retrieving a second electronic document from a location referenced via a link within the first electronic document; and
   organizing the first and second electronic documents to form a compound electronic document.

29. A computing device, comprising:
   a processor;
   a memory coupled to the processor; and
   a process, when executed from the memory, causes the processor to:
   transmit a request to a first server over a network for a first electronic document,
   receive the first electronic document from the first server over the network, wherein the first electronic document is retrieved by the first server from a second server separated from the first server over the network in response to the request,
   retrieve a second electronic document from a location referenced via a link within the first electronic document, and
   organize the first and second electronic documents to form a compound electronic document.

30. An apparatus, comprising:
   a server to receive one or more requests from one or more clients over a network, to retrieve one or more electronic documents, specified by the one or more requests, from another server separated from the server over the network, to format the retrieved one or more electronic documents with one or more controls not previously found on the one or more electronic documents, and to transmit the formatted one or more electronic documents to the one or more clients over the network in response to the one or more requests, wherein the one or more controls are configured to enable a user of the one or more clients to interact with the server when activated.

31. The apparatus of claim 30, wherein the one or more controls comprise a print control that causes the server to transmit the one or more electronic documents to a print engine component associated with the server to print the one or more electronic documents when activated.

32. The apparatus of claim 30, wherein the one or more controls comprise at least one of the following:
   an options control that is configured to cause the server to present an option selection form to the one or more clients when activated; and a printer status control that is configured to cause the server to present a printer status page to the one or more clients when activated.

33. The apparatus of claim 30, wherein the one or more controls comprise a preview control that is configured to display on a browser at the one or more clients a view of the one or more electronic documents, selected by the user to be printed at the server, when activated.

34. The apparatus of claim 30, wherein the one or more controls comprise a previous control that is configured to provide access to previously rendered or printed documents.

35. The apparatus of claim 30, wherein the one or more controls comprise a create book control that is configured to cause the server to organize selected ones of the one or more electronic documents to form a compound electronic document.

36. The apparatus of claim 30, wherein the one or more controls comprise a control that is configured to allow a user of the one or more clients to select one or more of the one or more electronic documents to be included in a component electronic document.

37. The apparatus of claim 30, wherein the one or more controls comprise a control that is configured to turn a control bar having the one or more controls on and off.

* * * * *